US005858034A

United States Patent [19]

Shida et al.

[11] Patent Number: 5,858,034

[45] Date of Patent: Jan. 12, 1999

[54] DUST FILTER UNIT FOR CANISTERS

[75] Inventors: Kiyofumi Shida, Sioya-gun; Takeaki Nakajima, Kawachi-gun, both of Japan

[73] Assignee: Honda Giken Kogyo Kabushiki Kaisha, Tokyo, Japan

[21] Appl. No.: 821,767

[22] Filed: Mar. 20, 1997

[30] Foreign Application Priority Data

Apr. 26, 1996 [JP] Japan .................................... 8-131405

[51] Int. Cl.[6] .................................................. B01D 35/147

[52] U.S. Cl. ................................ 55/313; 55/417; 55/420; 96/144; 123/519

[58] Field of Search .............................. 55/318, 417, 420, 55/410, 385.3, DIG. 30, 312, 212, 213, 495, 313; 123/518, 519, 520, 521; 96/113, 143, 144; 137/511

[56] References Cited

U.S. PATENT DOCUMENTS 5,562,084 10/1996 Shimamura ............................ 123/520

FOREIGN PATENT DOCUMENTS 554587 8/1993 European Pat. Off. ............... 123/520

*Primary Examiner*—Jay H. Woo
*Assistant Examiner*—Robert Hopkins
*Attorney, Agent, or Firm*—Frishauf, Holtz, Goodman, Langer & Chick

[57] ABSTRACT

A dust filter unit for a canister is provided. An inlet port and an outlet port are formed in a housing and opening into the atmosphere. A communication port is formed in the housing and leading to the canister. A filter is arranged within the housing at a location between the inlet port and the output port. A first one-way valve is arranged within the housing at a location between the communication port and the outlet port, for allowing evaporative fuel to flow from the communication port to the outlet port. A second one-way valve is arranged within the housing at a location between the filter and the communication port, for allowing fresh air to flow from the filter to the communication port. Thus, the inlet port, outlet port, communication port, and first and second one-way valves are all provided in one piece within the housing.

7 Claims, 4 Drawing Sheets

61 61A 81 62 83 72 75 75c 72b 72c 61c 64 85 a 75b 75a OUTLET a DRAINED FROM CANISTER 72a 67 61b 69 61a 61 61A 81 62 b b INLET 83 75 72 75c 72b 72c 64 85 75b OUTLET 75a 61c DRAWN b INTO CANISTER b 72a 67 69 61a 61b

DUST FILTER UNIT FOR CANISTERS

BACKGROUND OF THE INVENTION

1. Field of the Invention

This invention relates to a dust filter unit for a canister of an evaporative fuel-processing system of an internal combustion engine.

2. Prior Art

A dust filter is generally employed in evaporative fuel-processing systems of internal combustion engines. FIG. 1 shows the arrangement of an evaporative fuel-processing system of an internal combustion engine, employing a conventional dust filter for a canister of the system. In the figure, a canister 226 which adsorbs evaporative fuel delivered from a fuel tank 223 has an open-to-atmosphere port 225 from which extends a drain passage 209 which opens into the atmosphere. Arranged across the drain passage 209 is a vent shut valve 252 for blocking the drain passage 209 during leakage checking of an evaporative emission control system including the fuel tank 223 and the canister 226, which is formed by an electromagnetic valve and electrically connected to an ECU 206 such that a valve element 252*a* thereof is moved in response to a driving signal from the ECU 206 to close a valve bore 253*a* formed in an end of a drain passage 253 connected to the drain passage 209. When no driving signal is output from the ECU 206, the valve element 252*a* is biased by a spring, not shown, in a position where the vent shut valve 252 is open.

The drain passage 253 extends from the vent shut valve 252 and is bifurcated into an inlet passage 254 and an outlet passage 255 which have respective one-way valves 258 and 259 arranged thereacross. These passages 254, 255 terminate in the atmosphere. When the pressure within the passage 253 is lower than the atmospheric pressure, the one-way valve 258 opens, while when the former is higher than the latter, the one-way valve 259 opens.

Arranged across an end of the inlet passage 254 opening into the atmosphere is a filter box 261 accommodating a drain filter 262 in the form of a cylinder formed of a meshed material, as a dust filter. Fresh air is introduced through the end of the inlet passage 254, passes through the cylindrical body of the drain filter 262 via an outer peripheral surface thereof into the interior of the filter 262 and then flows toward the one-way valve 258.

The drain filter 262, which is accommodated in the filter box 261 arranged across the inlet passage on the atmosphere side of the vent shut valve 252 arranged across the drain passage 209, filters out alien substances such as dust and dirt so that clean fresh air is supplied to the canister 226. As a result, failure of the valve element 252*a* to fully close the valve bore 253*a* in the passage 253 due to the presence of alien substances mixed in fresh air introduced from the atmosphere; can be avoided even if the vent shut valve 252 is activated, when leakage checking of the canister 226 and its associated passages is carried out.

In the conventional evaporative fuel-processing system including the dust filter, however, the one-way valve 259 is arranged across the outlet passage 255 branching off from the drain passage 253 on the atmosphere side of the vent shut valve 252, while the other one-way valve 258 and the filter box 261 are arranged across the inlet passage 254. Further, these valves and filter box are formed of separate pieces. This requires a large mounting space and imposes limitations on the layout of the passages in an automotive vehicle.

SUMMARY OF THE INVENTION

It is the object of the invention to provide a dust filter unit for canisters, which does not require a large mounting space and facilitates laying out the filter, one-way valves and passages in automotive vehicles.

To attain the above object, the present invention provides a dust filter unit for a canister, comprising:

- a housing;
- an inlet port and an outlet port formed in the housing and opening into the atmosphere;
- a communication port formed in the housing and leading to the canister;
- a filter arranged within the housing at a location between the inlet port and the output port;
- a first one-way valve arranged within the housing at a location between the communication port and the outlet port, for allowing evaporative fuel to flow from the communication port to the outlet port; and
- a second one-way valve arranged within the housing at a location between the filter and the communication port, for allowing fresh air to flow from the filter to the communication port.

According to the above arrangement, a large mounting space is not required, thereby facilitating the layout within the vehicle. Further, the present invention enables a reduction in the number of component parts used and facilitates the assemblage thereof, thereby resulting in a decrease in cost.

Preferably, the filter is formed by a cylindrical member having one end and a diametrical center, the second one-way valve being arranged at the one end of the cylindrical member and substantially in alignment with the diametrical center of the cylindrical member.

The employment of the cylindrical filter and the arrangement of the second one-way valve at one end of the filter substantially in alignment with the diametrical center thereof can further permit designing the unit more compact in size, leading to a further reduced mounting space.

Also preferably, the first and second one-way valves are each formed by a check valve.

Alternatively, the first and second one-way valves are each formed by a flap valve. If flap valves are thus used, the use of springs which are consumable parts can be dispensed with.

In a preferred embodiment of the invention, the dust filter unit for a canister according to the invention comprises:

- a housing having a first wall and a second wall partitioning an interior of the housing into a first chamber, a second chamber, and a third chamber;
- an inlet port formed in the housing and opening into the atmosphere and into the first chamber;
- an outlet port formed in the housing and opening into the atmosphere and into the third chamber;
- a communication port formed in the housing and opening into the second chamber and leading to the canister;
- a filter accommodated within the first chamber;
- a first one-way valve arranged within the second chamber, the first one-way valve having a valve bore formed through a portion of the first wall partitioning between the first chamber and the second chamber, and a valve element disposed to open the valve bore when pressure within the first chamber exceeds pressure within the second chamber by a predetermined amount or more; and
- a second one-way valve arranged within the third chamber, the second one-way valve having a valve bore formed through the second wall partitioning between the second chamber and the third chamber, and a valve element disposed to open the valve bore when the pressure within the second chamber exceeds pressure within the third chamber by a predetermined amount or more.

According to the above arrangement, intermediate passages connecting between component elements can be dispensed with or omitted, leading to a compact entire construction. Besides, the omission of intermediate passages connecting between component elements results in a reduction in the flow resistance on the drain side.

The above and other objects, features, and advantages of the invention will become more apparent from the following detailed description taken in conjunction with the accompanying drawings.

DETAILED DESCRIPTION

The invention will now be described in detail with reference to the drawings showing embodiments thereof.

Figure 2:
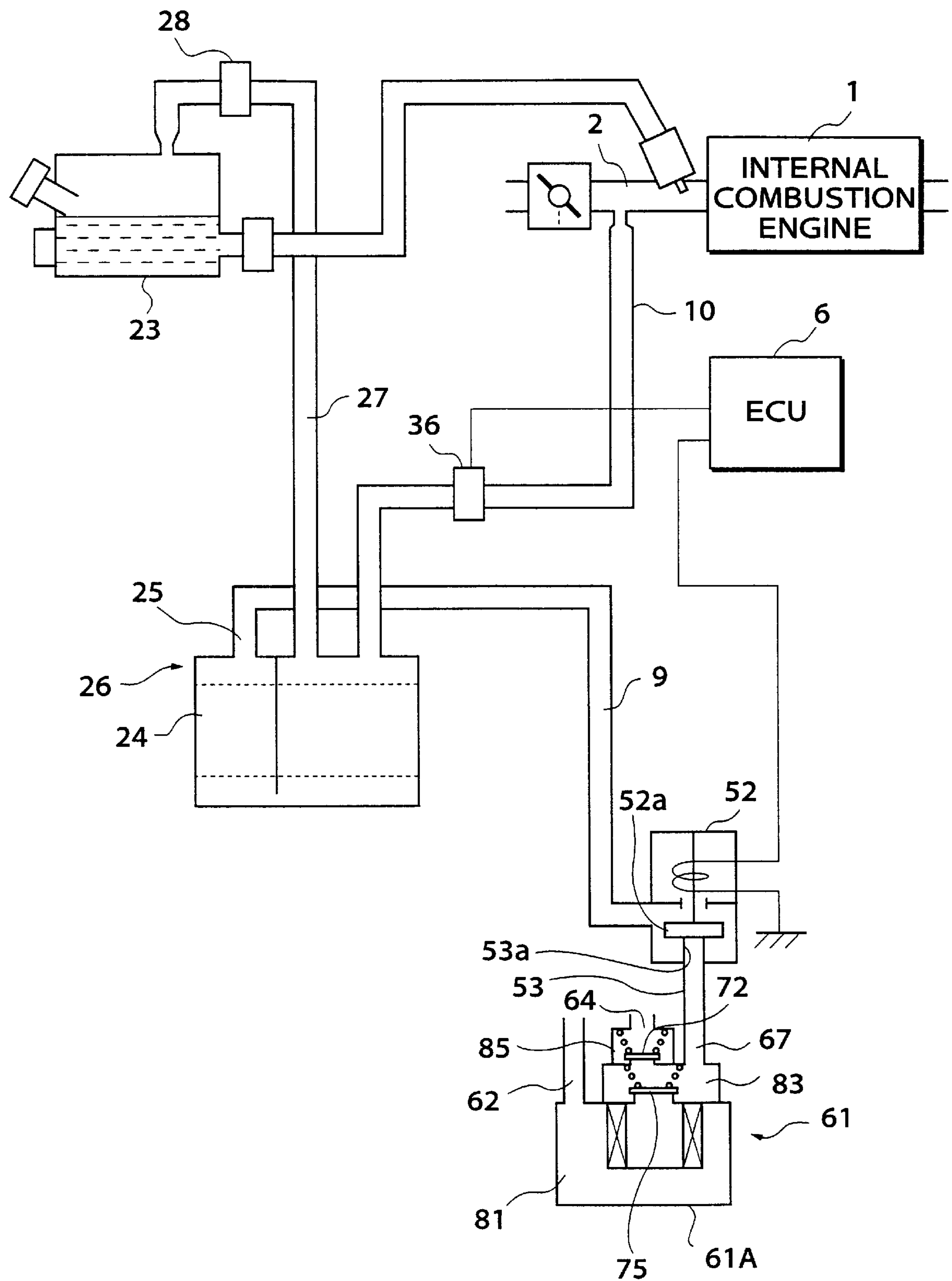
FIG. 2 is a schematic diagram showing the arrangement of an evaporative fuel-processing system to which is applied a dust filter unit for a canister according to a first embodiment of the present invention.

Referring first to FIG. 2, there is illustrated the arrangement of an evaporative fuel-processing system of an internal combustion engine, to which is applied a dust filter unit according to a first embodiment of the invention. In FIG. 2, a charging passage 27 extends between a fuel tank 23 and a canister 26, through which evaporative fuel flows. A two-way valve 28 is arranged across the charging passage 27. A purging passage 10 extends between the canister 26 and an intake pipe 2 of the engine 1, for purging evaporative fuel into the intake pipe 2. Arranged across the purging passage 10 is a purge control valve 36 which is electrically connected to an ECU 6.

The canister 26 accommodates activated carbon 24 as an adsorbent, and has a ceiling wall thereof formed therein with an open-to-atmosphere port 25. Connected to the port 25 is an end of a drain passage 9 which is connected at the other end thereof to another drain passage 53 leading to the atmosphere, with a vent shut valve 52 arranged across a junction of the two passages. The vent shut valve 52 is formed of an electromagnetic valve and is electrically connected to the ECU 6 such that a valve element 52*a* thereof is moved in response to a driving signal from the ECU 6 to close a valve bore 53*a* formed in an end of the drain passage 53. When no driving signal is output from the ECU 6, the valve element 52*a* is biased by a spring, not shown, in a position where the vent shut valve 52 is open.

Figure 1:
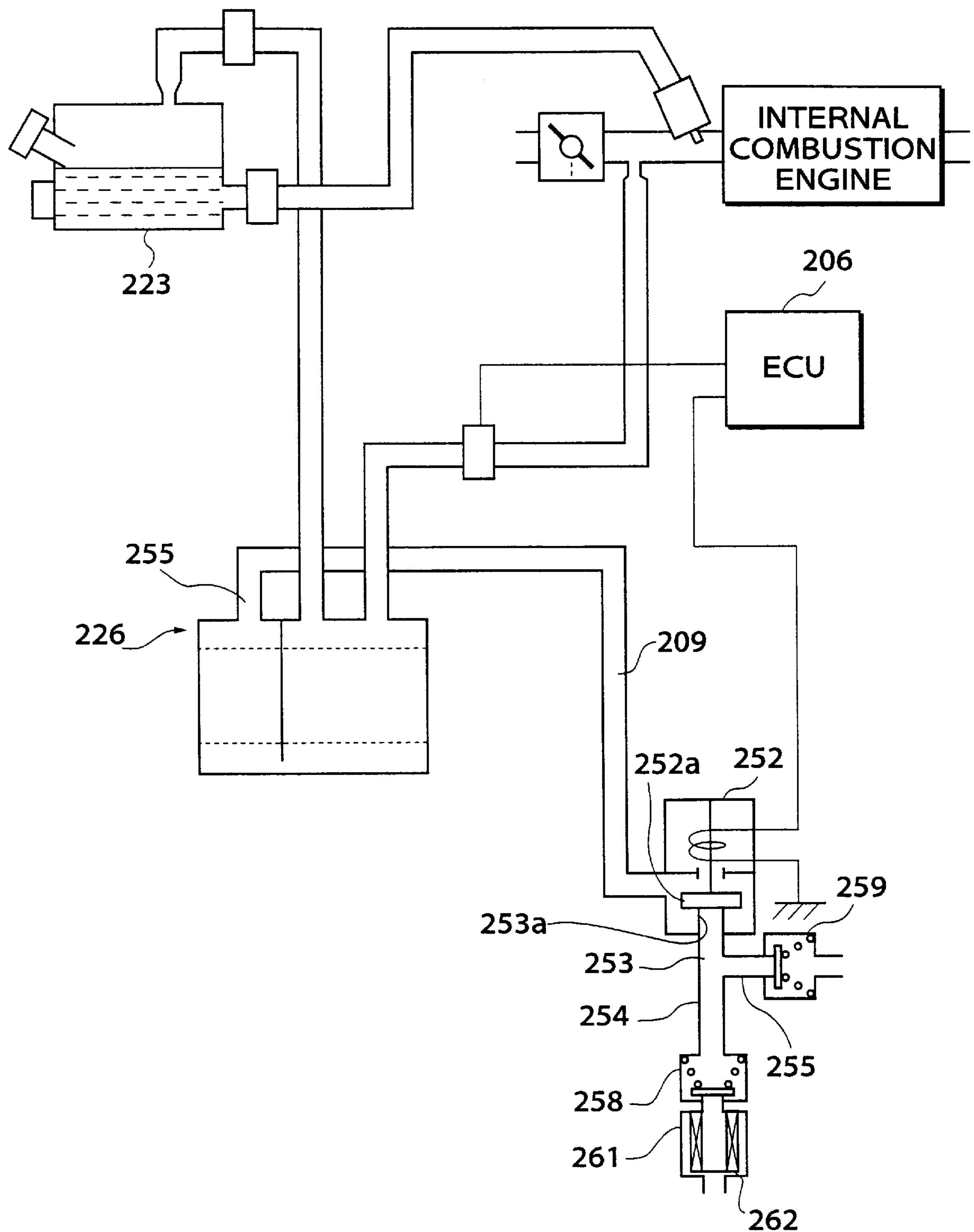
FIG. 1 is a schematic diagram showing the arrangement of an evaporative fuel-processing system to which is applied a conventional dust filter for a canister.

The above described arrangement is substantially identical with that of the conventional evaporative fuel-processing system shown in FIG. 1.

Figure 3A:
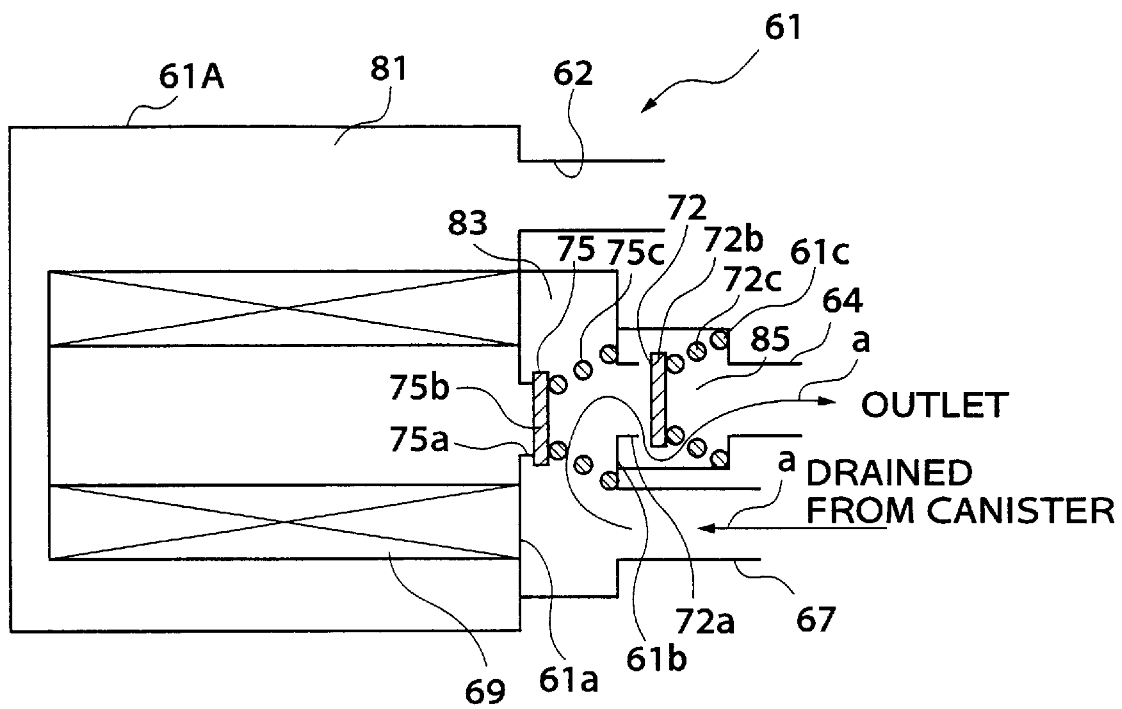
FIG. 3A is a schematic sectional view showing the construction of the dust filter unit appearing in FIG. 1, which is in a state where evaporative fuel is discharged from the canister.
Figure 3B:
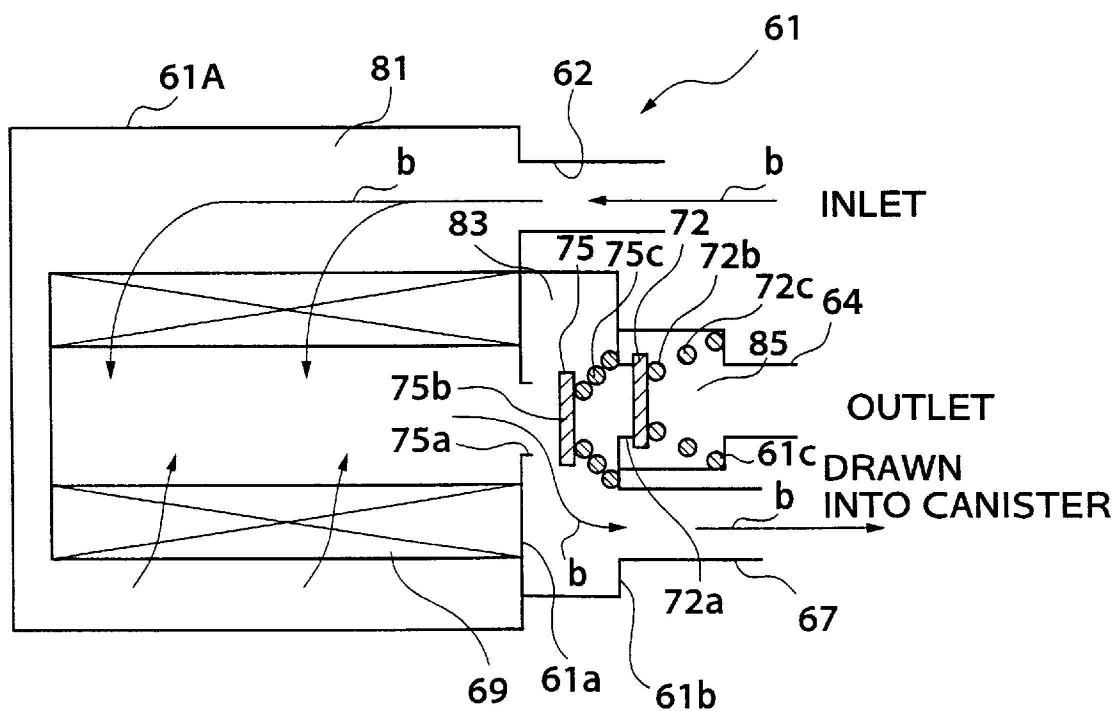
FIG. 3B is a similar view to FIG. 3A, but showing a state where fresh air is introduced into the canister.

A dust filter unit 61 is arranged across the other end of the drain passage 53. FIGS. 3A and 3B schematically show in section the construction of the dust filter unit 61. FIG. 3A shows a flow of evaporative fuel being drained from the canister 26, and FIG. 3B shows a flow of fresh air being introduced into the canister 26.

The dust filter unit 61 has a housing 61A which has an interior thereof divided into a chamber 81, a chamber 83 adjacent to the chamber 81, and a chamber 85 adjacent to the chamber 83 on a side remote from the chamber 81, by first and second walls 61*a* and 61*b*, respectively. The first wall 61*a* of the housing 61A is formed therein with an inlet port 62 communicating with the atmosphere and opening into the chamber 81, and the second wall 61*b* is formed therein with a communication port 67 leading to the canister 26 and opening into the chamber 83. Further, an end wall 61*c* of the housing 61A which defines the chamber 85 is formed therein with an outlet port 64 communicating with the atmosphere and opening into the chamber 85.

Arranged within the chamber 83 is a one-way valve 75 which is formed by a check valve comprised of a valve bore 75*a* formed through a portion of the wall 61*a* partitioning between the chambers 81 and 83, a valve element 75*b* disposed to open and close the valve bore 75*a*, and a spring 75*c* disposed to urge the valve element 75*b* toward the valve bore 75*a*. The one-way valve 75 opens when the pressure within the chamber 81 is higher than the pressure within the chamber 83 by a predetermined amount or more.

On the other hand, arranged within the chamber 85 is a one-way valve 72 which is formed by a check valve comprised of a valve bore 72*a* formed through the wall 61 partitioning between the chambers 83 and 85, a valve element 72*b* disposed to open and close the valve bore 72*a*, and a spring 72*c* disposed to urge the valve element 72*b* toward the valve bore 72*a*. The one-way valve opens when the pressure within the chamber 83 is higher than the pressure within the chamber 85 by a predetermined amount or more.

Accommodated within the chamber 81 is a dust filter 69 in the form of a cylinder formed of a meshed material. The filter 69 is mounted at one end thereof on the wall 61*a* such that the valve bore 75*a* is almost aligned with a diametrical center of the filter 69. The other end of the filter 69 is closed such that fresh air cannot enter the filter through the other end.

With the above construction of the dust filter unit 61, when evaporative fuel is drained from the canister 26, it flows through the communication port 67 into the chamber 83 to forcibly open the one-way valve 72 and is discharged into the atmosphere through the outlet port 64, as shown by arrows a in FIG. 3A. On the other hand, when fresh air is introduced into the canister 26, it flows through the inlet port 62 into the chamber 81, wherefrom it enters the filter 69 via the outer peripheral portion thereof to forcibly open the one-way valve 75 to exit through the communication port 67 into the passage 53, as indicated by arrows b in FIG. 3B. Then, the fresh air passes through the vent shut valve 52 to be delivered to the canister 26.

According to the dust filter unit 61 of the first embodiment, the one-way valves 72, 75, filter 69 and passages in which fresh air or evaporative fuel flows are provided in one piece within the housing 61A. As a result, intermediate passages connecting between component elements can be dispensed with or omitted, leading to a compact entire construction. Accordingly, a large mounting space is not required, thereby facilitating the layout within the vehicle. Further, the present invention enables a reduction in the number of component parts used and facilitates the assemblage thereof, thereby resulting in a decrease in cost. In addition, the omission of intermediate passages connecting between component elements results in a reduction in the flow resistance on the drain side. Moreover, the employment of the cylindrical filter 69 and the arrangement of the one-way valve 75 at one end of the filter in alignment with the diametrical center thereof can further permit designing the unit to be more compact in size, leading to a further reduced mounting space.

Figure 4A:
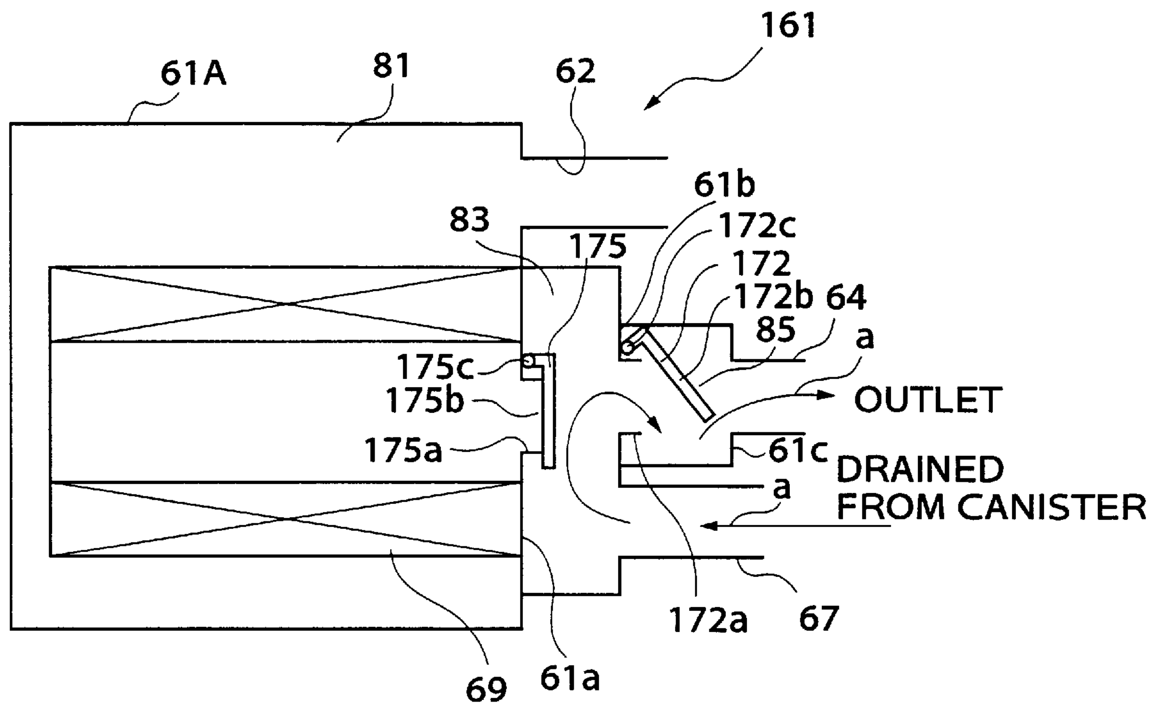
FIG. 4A is a schematic sectional view showing the construction of a dust filter unit according to a second embodiment of the invention, which is in a state where evaporative fuel is discharged from the canister.
Figure 4B:
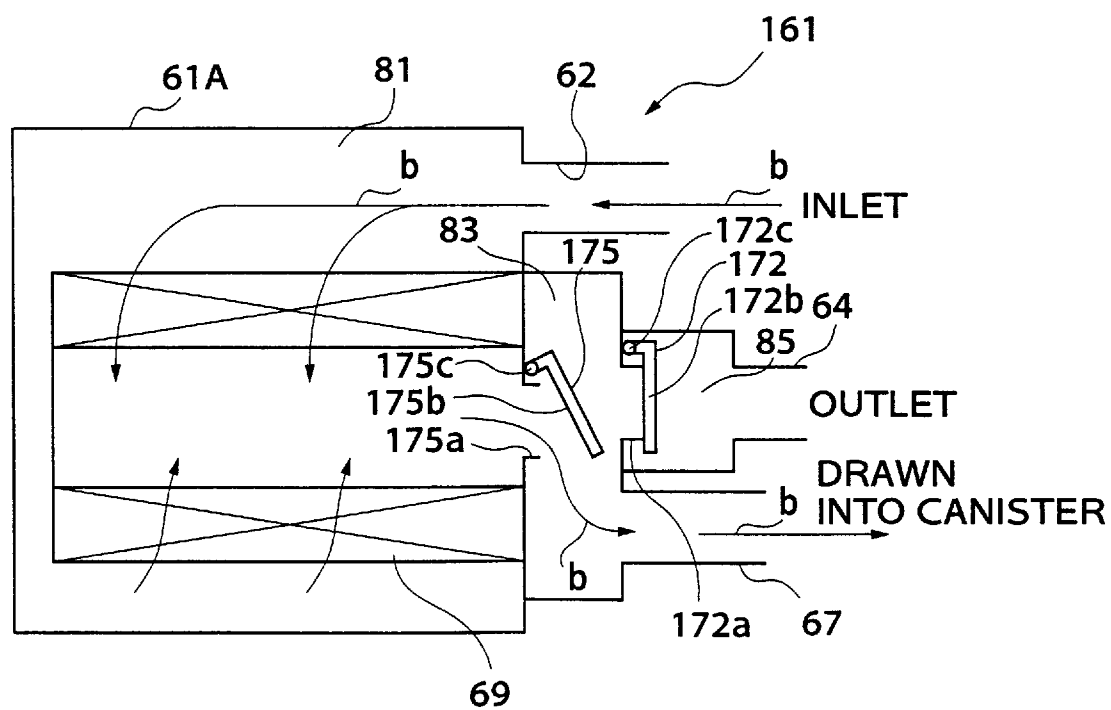
FIG. 4B is a similar view to FIG. 4A, but showing a state where fresh air is introduced into the canister.

FIGS. 4A and 4B show the construction of a dust filter unit according to a second embodiment of the invention. FIG. 4A shows a flow of evaporative fuel being drained from the canister 26, and FIG. 4B shows a flow of fresh air being introduced into the canister 26. In FIGS. 4A and 4B, elements and parts corresponding to those in FIGS. 3A and 3B showing the first embodiment are designated by identical reference numerals, description of which is omitted.

In the second embodiment, a one-way valve 175 arranged in the chamber 83 is formed by a flap valve which is comprised of a valve bore 175*a* formed through the portion of the wall 61*a* partitioning between the chambers 81 and 83, and a valve element 175*b* in the form of a flap disposed to open and close the valve bore 175*a*. The valve element 175*b* is formed by a generally L-shaped member or flap and pivotally mounted on the wall 61*a* by means of a mounting shaft 175*c*. The valve element 175*b* is held in a position where it closes the valve bore 175*a* due to its own weight when there is no predetermined pressure difference between the chambers 81 and 83, while when the pressure within the chamber 81 exceeds the pressure within the chamber 83 by a predetermined amount or more, the valve element 175*b* pivots into a position where it opens the valve bore 175*a*.

Similarly, a one-way valve 172 arranged in the chamber 85 is also formed by a flap valve comprised of a valve bore formed through the wall 61*b* partitioning between the chambers 83 and 85, and a valve element 172*b* disposed to open and close the vale bore 172*a*. The valve element 172*b* is formed by a generally L-shaped member or flap and pivotally mounted on the wall 61*b* by means of a mounting shaft 172*c*. The valve element 172*b* is held in a position where it closes the valve bore 172*a* due to its own weight when there is no predetermined pressure difference between the chambers 83 and 85, while when the pressure within the chamber 83 exceeds the pressure within the chamber 85 by a predetermined amount or more, the valve element 172*b* pivots into a position where it opens the valve bore 172*a*.

With the above construction of the dust filter unit 161, similarly to the first embodiment described above, when evaporative fuel is drained from the canister 26, it flows through the communication port 67 into the chamber 83 to forcibly open the one-way valve 172 and is discharged into the atmosphere through the outlet port 64, as shown by arrows a in FIG. 4A. On the other hand, when fresh air is introduced into the canister 26, it flows through the inlet port 62 into the chamber 81, wherefrom it enters the filter 69 via the outer peripheral portion thereof to forcibly open the one-way valve 175 to exit through the communication port 67 into the passage 53, as indicated by arrows b in FIG. 4B. Then, the fresh air passes through the vent shut valve 52 to be delivered to the canister 26.

According to the second embodiment, similar results to those of the first embodiment can be obtained, and in addition the use of springs which are consumable parts can be dispensed with.

What is claimed is:

1. A dust filter unit for a canister, comprising:

a housing having a side portion;

an inlet port and an outlet port formed in said side portion of said housing and opening into the atmosphere;

a communication port formed in said side portion of said housing and leading to said canister;

a filter arranged within said housing at a location between said inlet port and said communication port;

a first one-way valve arranged within said housing at a location between said communication port and said outlet port for allowing evaporative fuel to flow from said communication port to said outlet port; and a second one-way valve arranged within said housing at a location between said filter and said communication port for allowing fresh air to flow from said filter to said communication port.

2. A dust filter unit as claimed in claim 1, wherein said filter comprises a cylindrical member having one end and a diametrical center, said second one-way valve being arranged at said one end of said cylindrical member and substantially in alignment with said diametrical center of said cylindrical member.

3. A dust filter unit as claimed in claim 1, wherein said first and second one-way valves each comprise a check valve.

4. A dust filter unit as claimed in claim 1, wherein said first and second one-way valves each comprise a flap valve.

5. A dust filter unit for a canister, comprising:

a housing having a first wall and a second wall partitioning an interior of said housing into a first chamber, a second chamber, and a third chamber;

an inlet port formed in said housing and opening into the atmosphere and into said first chamber;

an outlet port formed in said housing and opening into the atmosphere and into said third chamber;

a communication port formed in said housing and opening into said second chamber and leading to said canister;

a filter accommodated within said first chamber;

a first one-way valve arranged within said second chamber, said first one-way valve having a valve bore formed through a portion of said first wall partitioning said first chamber and said second chamber, and a valve element disposed to open said valve bore when a pressure within said first chamber exceeds a pressure within said second chamber by a predetermined amount; and a second one-way valve arranged within said third chamber, said second one-way valve having a valve bore formed through said second wall partitioning said second chamber and said third-chamber, and a valve element disposed to open said valve bore when said pressure within said second chamber exceeds a pressure within said third chamber by a predetermined amount.

6. A dust filter unit as claimed in claim 5, wherein said first and second one-way valves each comprise a check valve.

7. A dust filter unit as claimed in claim 5, wherein said first and second one-way valves each comprise a flap valve.

* * * * *